Figure 1:
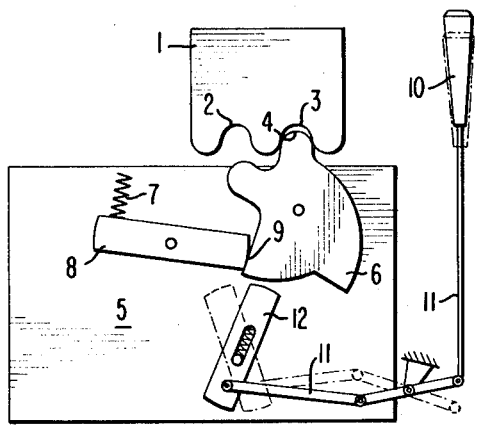

United States Patent

[11] 3,580,624

[72] Inventors Gunter Gmeiner;
 Christian Grabner, Sindelfingen, Germany
[21] Appl. No. 754,914
[22] Filed Aug. 23, 1968
[45] Patented May 25, 1971
[73] Assignee Daimber-Benz Aktiengesellschaft
 Stuttgart-Unterturkheim, Germany
[32] Priority Aug. 26, 1967
[33] Germany
[31] P 16 53 957.4

[54] INSTALLATION FOR CONTROLLING THE CLOSING CONDITION OF PARTS ADAPTED TO BE MUTUALLY LOCKED, ESPECIALLY IN MOTOR VEHICLES
16 Claims, 9 Drawing Figs.
[52] U.S. Cl. .................................................. 292/216
[51] Int. Cl. .................................................. E05c 3/26

[50] Field of Search............................................. 292/376,
 216; 180/112, 113; 70/441, 432

[56] References Cited
UNITED STATES PATENTS
1,212,876 1/1917 Armitage.................... 70/432X
2,103,363 12/1937 Hansen......................... 70/441X
2,713,345 7/1955 Stanity et al. ................. 134/58
2,896,641 7/1959 Kauffman et al. ............. 134/58

Primary Examiner—Richard E. Moore
Attorney—Craig, Antonelli, Stewart & Hill

ABSTRACT: An installation for controlling the closing condition of parts adapted to be mutually locked or closed, especially in motor vehicles in which the engaging condition of a closure device is sensed by appropriate means and a feedback signal, which may be either mechanical, optical or acoustic in nature, indicates when the parts are completely closed or locked.

INVENTORS
GÜNTER GMEINER
CHRISTIAN GRABNER

BY Craig & Antonelli

ATTORNEYS

PATENTED MAY25 1971 3,580,624

SHEET 2 OF 2

INVENTORS
GÜNTER GMEINER
CHRISTIAN GRABNER

BY *Cushig & Antonelli*

ATTORNEYS ical-electrical sensing means and optical indicating means connected therewith in accordance with the present invention, illustrating three positions thereof.

INSTALLATION FOR CONTROLLING THE CLOSING CONDITION OF PARTS ADAPTED TO BE MUTUALLY LOCKED, ESPECIALLY IN MOTOR VEHICLES

The present invention relates to an installation for the control of the closing condition of parts adapted to be mutually locked or closed, especially for motor vehicles, with the aid of which a safe locking or closing is made possible.

The limit of the closing safety of parts adapted to be mutually locked or closed resides in the possibility conditioned on the principle that the closing elements do not completely engage but merely are supported or lean one against the other.

This condition also referred to as incomplete engagement can occur when, for example, a door is slammed either too soft or too hard, or if the elastic yieldingness between the closure lug or plate and the lock becomes too small by warping of the door or by an excessively hard sealing rubber. The presently known locking devices may be locked in the aforementioned condition, however, there exists the danger as a result of driving shocks and impacts occurring during the drive that, for example, a door assumed to be securely locked, suddenly springs open.

In order that a door, an engine hood or a luggage-space lid cannot completely spring open while driving, the corresponding closure devices were equipped with an additional safety latch or locking device. However, also in the position in which the safety or locking device is operative, an incomplete engagement may occur so that this prior art safety installation does not completely fulfill its purpose. Therebeyond, in case of breakage of the closing or locking spring, the function of the safety latching or locking device is no longer in force, whereby for example, a door may suddenly spring open completely.

Consequently, an installation for the control of the closing condition of parts adapted to be mutually locked or closed, especially for motor vehicles, is proposed whereby according to the present invention, the engaging condition of a closure of locking mechanism is sensed by appropriate means and a mechanical, optical or acoustic indication or answer-back signal takes place.

In one embodiment according to the present invention, the locking or closure element or a part operatively connected therewith includes a control cam which is sensed by a spring-loaded catch, whereby furthermore a sensing means is operatively connected with a locking knob, for example, by way of a linkage, which on the one hand, abuts against the catch when pushing down the locking knob if, for example, the door is not completely or securely closed, and which on the other hand, with a completely or securely closed door, reaches its opposite position past the catch.

According to a further feature and development of the inventive subject matter, the sensing means is provided in its longitudinal direction with an elongated aperture and is supported on a pin whereby a compression spring is arranged between the upper, rounded-off portion of the elongated aperture and the pin so that the sensing means, during the closing of the prelocked door, gives way or yields elastically to the catch.

According to a preferred embodiment of the present invention, the closure or locking mechanism or a part operatively connected therewith includes a control cam which is sensed by a spring-loaded catch which, in its turn, receives a rotatably supported lever pressed against an abutment by means of a draw spring, whereby additionally a sensing member is operatively connected with a locking knob, for example, by way of a linkage which, on the one hand, when pushing down the locking knob, abuts against the lever and which, on the other, reaches its opposite position past the catch in case of a securely closed door.

A prelocking is possible because in this case, the catch and the lever operatively connected therewith are pressed downwardly by the control cam of the closing or locking mechanism whereby the lever hits against the sensing member whereas the catch yields and is deflected elastically in the downward direction.

In another embodiment of the present invention, a compression spring is arranged between the catch, abutting against the control cam of the closing or locking mechanism or of a part operatively connected therewith, and a locking lever whereby additionally an electric switch with a fork-shaped sensing member is provided which in case of an open or not completely closed door, is pressed down by the locking lever or the catch.

Appropriately, during the pressing down of the sensing member, an electric contact is closed in a conventional manner whereby a control light disposed within the field of vision of the driver, lights up.

Accordingly, it is an object of the present invention to provide an installation for the control of the closing condition of parts adapted to be mutually closed or locked, especially for motor vehicles which avoids by simple means the aforementioned shortcomings and drawbacks.

Another object of the present invention resides in an installation for the control of the closing condition of mutually lockable parts which avoids the danger of sudden opening of the parts during the drive of the vehicle while these parts were thought safely closed.

A further object of the present invention resides in an installation of the type described above which greatly increases the safety of vehicles by eliminating the danger of unnoticed, incomplete closing or locking of doors, hoods or lids.

Figure 2:
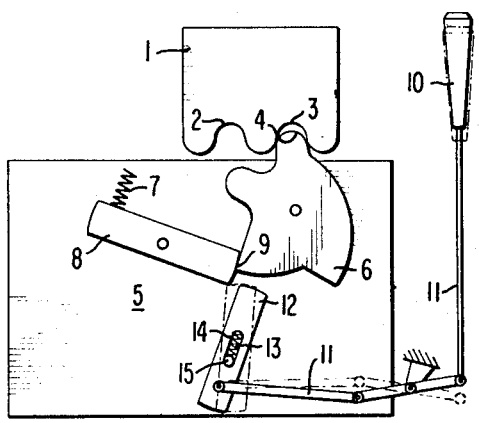
Figure 3:
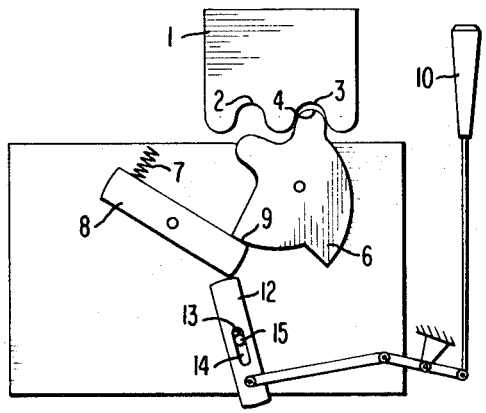
Figure 4:
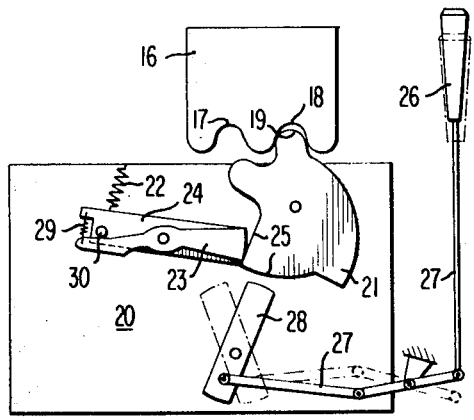
Figure 5:
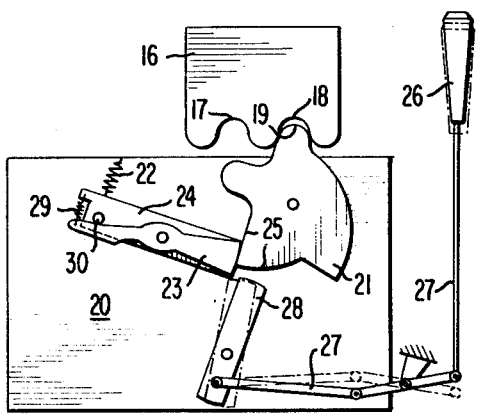
Figure 6:
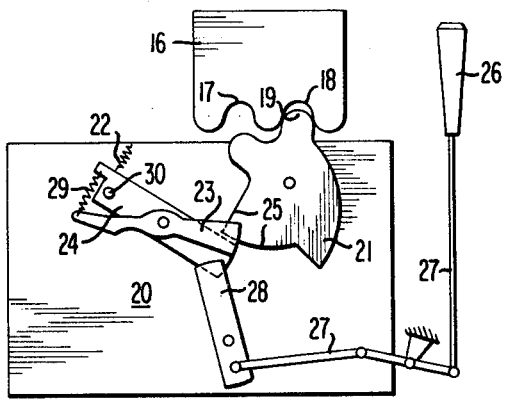
Figure 7:
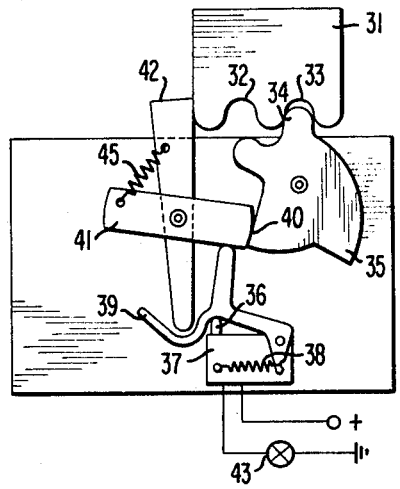
Figure 8:
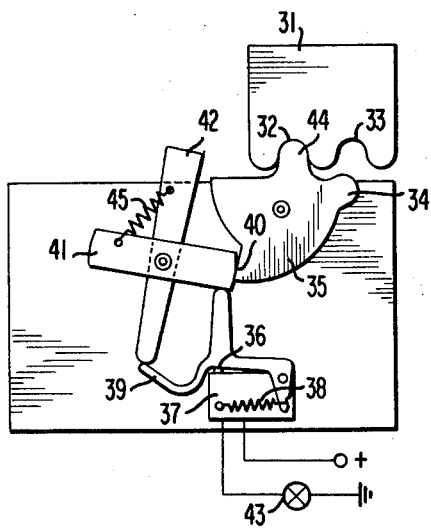
Figure 9:
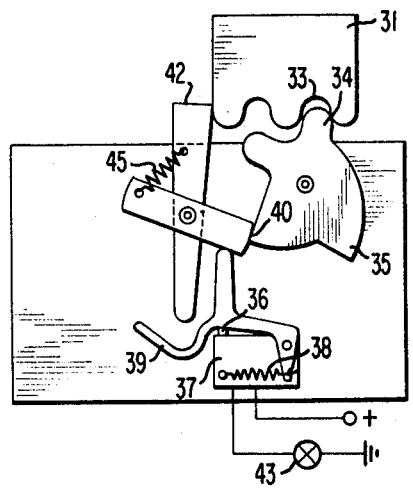

These and further objects, features, and advantages of the present invention will become more obvious from the following description, when taken in connection with the accompanying drawing, which shows, for purposes of illustration only, several embodiments in accordance with the present invention, and wherein:

FIGS. 1 to 3 are schematic views of a first embodiment of a lock with mechanical sensing and locking means in accordance with the present invention, illustrating three possible locking positions thereof;

FIGS. 4 to 6 are schematic views of a second embodiment of a lock with mechanical sensing and locking means in accordance with the present invention, illustrating three possible locking positions thereof; and FIGS. 7 to 9 are schematic views of a lock with a mechanical-electrical sensing means and optical indicating means connected therewith in accordance with the present invention, illustrating three positions thereof.

Referring now to the drawing wherein like reference numerals are used throughout the various views to designate corresponding parts, and more particularly to FIG. 1, the closure lug or plate 1, as can be seen from this Figure, includes a safety notch 2 and a closing notch 3. The tooth 4 of locking member 6 rotatably supported within the locking housing 5 engages entirely in the closing notch with a completely closed door. The spring 7 of the catch 8, also rotatably supported in the lock housing 5, and forming a cam follower with respect to the locking member 6, is unstressed or relieved, whereby the catch 8 so abuts against the control cam 9 of the locking member 6 that the sensing member 12 actuated from a locking knob 10 by way of a linkage 11, pivots into its locking position, indicated in dash line and past the catch 8. During this pivotal movement, the catch 8 and the door-actuating pushbutton (not shown) connected with the catch 8, is locked thereby in a conventional manner, and therefore not shown in detail so that an opening of the door from the outside is no longer possible or is possible only with the aid of a key.

A closing position is illustrated in FIG. 2, in which the tooth 4 does not completely engage in the locking notch 3. During the attempt to push down the locking knob 10, the sensing member 12 abuts against the catch 8 because the catch 8 cannot pivot back into its initial, starting position by reason of the position of the locking member 6. A pushing down of the locking knob 10 becomes possible only if, after a renewed closing of the door, the catch 8 has assumed a position corresponding to that of FIG. 1.

As can be seen from FIG. 3, a prelocking is made possible (excluding thereby normally the driver's door) if the locking knob 10 is pushed down with an open door. During the closing operation, the control cam 9 of the closure member 6 displaces the catch 8 downwardly whereby the latter abuts against the top side of the sensing member 12. The sensing member 12 is able to yield obliquely downwardly against the pressure of a spring 13 because it is longitudinally displaceable in an elongated aperture 14 whereby a pin 15 projecting from the lock housing 5 serves as guide means. As soon as the catch 8 abuts against the apex of the control cam 9, the catch 8 and therewith also the sensing member 12 move again upwardly.

In FIG. 4, the correct closing position of a lock is illustrated whose construction far-reachingly corresponds to the lock illustrated in FIGS. 1 to 3. The closure lug or plate 16 is provided with a safety notch 17 and with a closing notch 18. The tooth 19 of the locking member 21 rotatably supported in the lock housing 20 engages completely in the closing notch 18. The spring 22 of the catch 24 which, together with a lever 23 is also rotatably supported at the lock housing 20, is relieved or unstressed whereby the catch 24 so abuts against the control cam 25 of the locking member 21 in the manner of a cam follower that the sensing member 28 actuated from a locking knob 26 by way of a linkage 27 pivots into its locking position indicated in dash line past the lever 23. The locking of a door-actuating pushbutton (not shown) takes place simultaneously by conventional means, not illustrated in detail, so that an opening of the door from the outside is no longer possible or possible only with the aid of a key.

A pushing down of the locking knob 26 is not possible if, as illustrated in FIG. 5, the door is not securely closed, i.e., if the tooth 19 does not completely engage in the closing notch 18 because the sensing member 28 then abuts against the lever 23.

It can be seen from FIG. 6 that with a prelocked door (excluding the driver's door) the control cam 25 of the locking member 21 presses the catch 24 elastically in the downwardly direction. The lever 23 thereby abuts against the sensing member 28 and moves against the force of the spring 29 away form the abutment 30. As soon as the catch 24 abuts against the apex of the control cam 25, the catch 24 as well as the lever 23 then again move upwardly.

The correct closing position of a lock having a mechanical-electrical sensing means is illustrated in FIG. 7. The closure lug or plate 31 is provided with a safety notch and with a closing notch 33. As can be seen, the tooth 34 of the closure member 35 engages completely in the closing notch 33. The contact pin 36 of the switch 37 is not pressed down by the fork-shaped sensing member 39 provided with a return spring 38 because neither the catch 41 abutting against the control cam 40 of the closure member 35 nor the locking lever 42 which is springily connected therewith by compression spring 45 and which abuts against the closure lug or plate 31, contacts the fork-shaped sensing member 39. The control light 43 does not light up because the energizing-current circuit is not closed.

A lighting up of the control light 43 occurs when, as illustrated in FIG. 8, the closure member 35 engages with its tooth 44 only in the safety notch 32. The locking lever 42 thereby does not abut against the closure lug or plate 31 and is deflected by the spring 45 so far that the locking lever 42 seizes the fork-shaped sensing member 39 and pushes the same downwardly whereby the current-energizing circuit for the control light 43 is closed by the switch 37.

In the closing position illustrated in FIG. 9, the tooth 34 of the closure member 35 does not engage completely in the closing notch 33. The spring 45 tensioned between the locking lever 42, abutting against the closure lug or plate 31, and the catch 41 is compressed because the control cam 40 of the closure member 35 has not moved so far that the abutting part of the catch 41 can pivot into its initial, starting position. The fork-shaped sensing member 39 pressed down by the catch 41 closes the contact of the switch 37 whereupon the control light 43 lights up and indicates the incorrect closing of the door.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of a person skilled in the art.

We claim:

1. An installation for the control of the closing condition of parts adapted to be mutually locked or closed, especially for motor vehicles, wherein the improvement comprises locking means including a relatively fixed part provided with notch means, control means provided with tooth means on a movable part for engaging in said notch means upon closing of the movable part, catch means for abutting against said control means, sensing means movable into the path of motion of said catch means for sensing the engaging condition of said locking means, and indicating means operatively connected with said sensing means for producing a signal indicating the engaging condition of said locking means.

2. An installation according to claim 1, wherein said indicating means is mechanical in nature.

3. An installation according to claim 1, wherein said indicating means is optical in nature.

4. An installation according to claim 1, wherein said indicating means is acoustical in nature.

5. An installation for the control of the closing condition of parts adapted to be mutually locked or closed, especially for motor vehicles, wherein the improvement comprises locking means, sensing means for sensing the engaging condition of said locking means, and indicating means operatively connected with said sensing means for producing a signal indicating the engaging condition of said locking means, wherein said locking means includes control cam means, spring-loaded catch means for abutting said control cam means, a locking knob operatively connected with said sensing means, and said sensing means being operable, on the one hand, to abut against the catch means during pressing-down of the locking knob if the door is not securely closed and on the other, to reach its position past the catch means in case of a securely closed door.

6. An installation according to claim 5, wherein the sensing means includes a sensing member provided with an elongated aperture in its longitudinal direction and is supported on a pin, spring means disposed between the upper rounded-off portion of the elongated aperture and the pin means so that the sensing member elastically deflects out of the path of the catch means during the closing of a prelocked door.

7. An installation for the control of the closing condition of parts adapted to be mutually locked or closed, especially for motor vehicles, wherein the improvement comprises locking means, sensing means for sensing the engaging condition of said locking means, and indicating means operatively connected with said sensing means for producing a signal indicating the engaging condition of said locking means, wherein the sensing means includes a sensing member provided with an elongated aperture in its longitudinal direction and is supported on a pin, spring means disposed between the upper rounded-off portion of the elongated aperture and the pin means so that the sensing member elastically deflects out of the path of the catch means during the closing of a prelocked door or the like.

8. An installation for the control of the closing condition of parts adapted to be mutually locked or closed, especially for motor vehicles, wherein the improvement comprises locking means, sensing means for sensing the engaging condition of said locking means, and indicating means operatively connected with said sensing means for producing a signal indicating the engaging condition of said locking means, wherein the locking means including control cam means, spring-loaded catch means for abutting the control cam means, rotatably supported lever means on said catch means which is pressed against an abutment means by a draw spring, a locking knob operatively connected with said sensing means, said sensing means being operable, on the one hand, to abut against the lever means during pushing down of the locking knob if a door is not securely closed and, on the other, to reach its position past the lever means with a securely closed door.

9. An installation according to claim 8, wherein with a prelocked door, the catch means and the lever means operatively connected therewith are pressed downwardly by the control cam means, the lever means thereby abutting against the sensing means whereas the catch means is able to give way elastically in the downward direction.

10. An installation for the control of the closing condition of parts adapted to be mutually locked or closed, especially for motor vehicles, wherein the improvement comprises locking means, sensing means for sensing the engaging condition of said locking means, and indicating means operatively connected with said sensing means for producing a signal indicating the engaging condition of said locking means, wherein said locking means includes control cam means, catch means for abutting against said cam means, locking lever means, spring means between said catch means and said locking lever means, electric switch means having a fork-shaped sensing member forming part of the sensing means, said sensing member being pushed down by one of the two parts consisting of the locking lever means and the catch means with an open door and with a not completely closed door.

11. An installation according to claim 10, wherein said switch means includes an electric contact closed during pressing down of the sensing member, and control light means disposed in the field of vision of the driver, which is energized upon closing of the electric contact.

12. An installation for monitoring the closing conditions of a door or like movable part, especially for motor vehicles, wherein the improvement comprises closure means for closing two parts, sensing means operatively connected with said closure means for sensing the engaging condition of said closure means, and means operatively connected with said sensing means for indicating the engaging condition of said closure means, wherein said closure means includes a relatively fixed part provided with notch means, control means provided with tooth means on the movable part for engaging in said notch means upon closing of the movable part, follower means operatively associated with said control means, said sensing means being unaffected by said follower means to complete its sensing movement with the movable member properly closed but being actuated by said follower means with an improperly closed movable part to indicate the improper closing condition.

13. An installation according to claim 12, wherein said control means includes cam means for the cam follower means.

14. An installation according to claim 13, wherein said follower means forms a catch.

15. An installation according to claim 14, further comprising means to enable said sensing means to elastically deflect out of the path of the follower means during closing of a prelocked door.

16. An installation according to claim 12, further comprising means to enable said sensing means to elastically deflect out of the path of the follower means during closing of a prelocked door.